US012303090B2

(12) United States Patent
Lutz et al.

(10) Patent No.: US 12,303,090 B2
(45) Date of Patent: May 20, 2025

(54) DOMESTIC APPLIANCE WITH AT LEAST ONE HEATER FOR A TUBULAR PIECE THROUGH WHICH A FLUID FLOWS

(71) Applicant: BSH Hausgeräte GmbH, Munich (DE)

(72) Inventors: Stephan Lutz, Zusamaltheim (DE); Stefan Pollithy, Forheim (DE); Markus Wecker, Gundremmingen (DE)

(73) Assignee: BSH Hausgeräte GmbH, Munich (DE)

( * ) Notice: Subject to any disclaimer, the term of this patent is extended or adjusted under 35 U.S.C. 154(b) by 1090 days.

(21) Appl. No.: 17/040,565

(22) PCT Filed: Apr. 10, 2019

(86) PCT No.: PCT/EP2019/059121
§ 371 (c)(1),
(2) Date: Sep. 23, 2020

(87) PCT Pub. No.: WO2019/197483
PCT Pub. Date: Oct. 17, 2019

(65) Prior Publication Data
US 2021/0059498 A1 Mar. 4, 2021

(30) Foreign Application Priority Data
Apr. 10, 2018 (DE) ..................... 10 2018 205 341.3
Apr. 10, 2018 (DE) ..................... 20 2018 001 820.1

(51) Int. Cl.
*A47L 15/42* (2006.01)
*D06F 39/04* (2006.01)
(Continued)

(52) U.S. Cl.
CPC ............ *A47L 15/4285* (2013.01); *H05B 3/46* (2013.01); *D06F 39/04* (2013.01); *F24H 9/1818* (2013.01);
(Continued)

(58) Field of Classification Search
CPC ....... A47L 15/4285; H05B 3/46; D06F 39/04; F24H 9/1818; F24H 2250/02
(Continued)

(56) References Cited

U.S. PATENT DOCUMENTS 4,326,552 A * 4/1982 Bleckmann ............... F24H 6/00 134/107
5,557,704 A * 9/1996 Dennis .................... D06F 39/04 392/458
(Continued)

FOREIGN PATENT DOCUMENTS

CN 101929056 A 12/2010
DE 102012200398 A1 * 7/2013 ......... A47L 15/4225
(Continued)

OTHER PUBLICATIONS

Machine Translation of DE102012200398 (Year: 2024).*
(Continued)

*Primary Examiner* — Steven W Crabb
*Assistant Examiner* — Thomas J Ward
(74) *Attorney, Agent, or Firm* — Michael E. Tschupp; Andre Pallapies; Brandon G. Braun

(57) ABSTRACT

A household appliance includes a channel section which can be heated from outside and can be configured for passage of a fluid, and a plurality of electrically interconnected heating conductor elements for heating purposes, with at least some of the heating conductor elements being electrically connected together in parallel and including a component arranged in a flow direction of the fluid.

15 Claims, 6 Drawing Sheets

(51) Int. Cl.
*F24H 9/1818* (2022.01)
*H05B 3/46* (2006.01)

(52) U.S. Cl.
CPC .... *F24H 2250/02* (2013.01); *H05B 2203/013* (2013.01)

(58) Field of Classification Search
USPC .......................................................... 392/480
See application file for complete search history.

(56) References Cited

U.S. PATENT DOCUMENTS

| | | | |
|---|---|---|---|
| 10,945,583 | B2 | 3/2021 | Jerg |
| 2014/0360700 | A1 | 12/2014 | Pszola |
| 2015/0086325 | A1 | 3/2015 | Albert et al. |

FOREIGN PATENT DOCUMENTS

| | | | | | |
|---|---|---|---|---|---|
| DE | 102015206331 | A1 | * | 10/2016 | ......... A47L 15/0076 |
| FR | 2641801 | A1 | | 7/1990 | |

OTHER PUBLICATIONS

Machine Translation of DE102015206331A1 (Year: 2024).*
International Search Report PCT/EP2019/059121 dated Jul. 3, 2019.
National Search Report CN 2019800247842 dated Nov. 15, 2023.

* cited by examiner

DOMESTIC APPLIANCE WITH AT LEAST ONE HEATER FOR A TUBULAR PIECE THROUGH WHICH A FLUID FLOWS

CROSS-REFERENCES TO RELATED APPLICATIONS

This application is the U.S. National Stage of International Application No. PCT/EP2019/059121, filed Apr. 10, 2019, which designated the United States and has been published as International Publication No. WO 2019/197483 A1 and which claims the priorities of German Patent Applications, Serial Nos. 20 2018 001 820.1, filed Apr. 10, 2018, and 20 2018 205 341.1, filed Apr. 10, 2018, pursuant to 35 U.S.C. 119 (a)-(d).

BACKGROUND OF THE INVENTION

The present invention relates to water-bearing household appliance, such as a dishwasher, in particular household dishwasher.

For such water-bearing household appliances, a uniform dissipation of heat from the heater due to flowing fluid is particularly important for proper functioning without the development of excessively high temperatures at the heater. Since some of the users, for example, do not operate a dishwasher as envisaged with salt in the water-softening, with detergent and rinse aid but omit, for example forget, one of these components, the washing chemistry is then not balanced. Deposits can then form on the heater, and these inhibit the transfer of energy into the fluid, and this usually leads to partial overheating of a heating conductor. This then usually results in a defect in the heater.

It is not possible to completely prevent formation of deposits in the event of such user behavior.

BRIEF SUMMARY OF THE INVENTION

The invention is based on the problem of achieving an improvement in the working life of the heater and of optimally avoiding defects.

The invention solves the problem by way of a subject matter having the features of the invention.

Because, according to the invention, at least some of the heating conductor elements are electrically connected together in parallel and are arranged with one component in the flow direction of the fluid, on the one hand it is possible that in the event of partial overheating only a small section of the heater is defective and the majority of the heater can continue to be operated. On the other hand, due to the arrangement of the heating conductors at least almost parallel to the flow direction of the fluid, a longer heat transfer path into the fluid is ensured.

If, for example, the household appliance comprises a dishwasher, in particular a household dishwasher, with a dishwasher cavity for receiving wash items, such as dishes, glasses, cutlery or the like, wherein circulating fluid, what is known as washing liquor, which can be heated and mixed with detergent and/or rinse aid and/or drying agent, can be applied to the wash items, this washing liquor can be heated according to the invention without an excessive effort being demanded of the customer and without said lapse by the customer having serious consequences.

For if there is overheating at one heating conductor, which is only intended to provide a small output fraction in relation to the overall output, this heating conductor blows while the remaining heating conductors continue to function normally.

With a sufficiently large number of heating conductors, heating of the fluid is then still possible to almost the entire extent. To ensure this a particular spacing has to be provided between the individual heating conductors so an arc which occurs does not damage the adjacent heating conductors. Preferably, this transverse spacing between the individual heating conductors is in the range between 0.4 and five millimeters. The spacing is smaller than the transverse extension of a respective heating conductor.

High integration with a minimization of installation space and number of components is achieved if the fluid can be heated by a heat pump.

In particular, the channel is surrounded by a circumferentially closed pipe section. The large number of heating conductors are attached to the outside of this pipe section. For high effectiveness of heat transfer to the fluid flowing in the pipe section, a thick film heater in particular can be attached to the outside of this pipe section.

The heater, in particular thick film heater, is favorably formed with a large number of heating conductors connected together in parallel. Their respective width perpendicular to the direction of flow of the fluid also plays a part in this since it determines the number of individual heating resistors connected in parallel which can be distributed on the circumference of the heat pipe. The optimum range for the width of this individual heating conductor lies between 1 millimeter and 30 millimeters, preferably between 2 millimeters and 15 millimeters, in order to thus exhibit a suitable electrical resistance on the one hand and to be able to distribute as many individual heating conductors as possible over the circumference on the other hand. The heating conductors each have a significant longitudinal extension compared to their width extension.

In particular, at least 85% of the circumference of the heating pipe and, more precisely, in particular substantially along its entire longitudinal extension, is occupied by heating elements for a high input of heat into the fluid. High area output, in other words a high heat input into the channel section, can be ensured thereby. The heat output per area, which is input into a wall region surrounding the channel section, is regarded as the area output.

Individual heating conductors can also be up to 70 millimeters wide. In addition, the heating conductors can also have different widths.

Preferably, the pipe section extends substantially longitudinally, in particular largely in a straight line. The fluid flows through this pipe section with a directional component substantially along the longitudinal direction of this pipe section.

In particular, the respective heating conductor extends from the input region up to the output region of the pipe section.

For the reasons given above, the heating conductors are arranged substantially in the flow direction of the fluid. This does not mean that they have to be completely parallel to the flow direction. Instead, the extension of the heating conductors can be at an acute angle $\alpha$ between 0.1° and 30° with respect to the flow direction of the fluid, in particular at an angle between 5° and 20°. As a result of this slightly inclined position, in a screen printing method for attaching the heater a doctor blade that is used can be pulled over the heating conductors in the circumferential direction without the doctor blade being pressed into a trough between the heating conductors and starting to swing in the process.

Because of the division into a plurality of individual heating resistors, the electrical output is also divided. If an individual heating resistor should blow due to overloading, the total output of the heating element is reduced by the heating output of this individual heating resistor. It is therefore favorable if an individual heating resistor has only the lowest possible output fraction, so the total power loss is as low as possible if a heating resistor blows.

Running on the outside in the circumferential direction of the channel section are preferably two electrical conductor paths for providing two electrical potentials at the two ends of the respective heating conductors. The heating conductors in each case extend between these two conductor paths or their potentials. Viewed in the flow direction of the fluid, the first electrical conductor path for the first electrical potential is preferably provided substantially at the start of the pipe section and, viewed in the flow direction of the fluid, the second electrical conductor path for the second electrical potential is preferably provided substantially at the end of the pipe section. The heating conductors are therefore electrically connected together in parallel.

It is advantageous, therefore, if the number of individual heating resistors is as high as possible. For this reason, five to 100 heating conductors, in particular 10 to 60 heating conductors, particularly favorably 20 to 40 heating conductors, are arranged so as to be distributed over the circumference of the channel.

Other developments of the invention are reproduced in the subclaims.

The advantageous designs and developments of the invention explained above and/or reproduced in the subclaims can be applied individually or else in any desired combination with each other—with the exception of, for example, in the cases of clear dependencies or incompatible alternatives.

The invention and its advantageous designs and developments and the advantages thereof will be explained in more detail below with reference to drawings that represent exemplary embodiments.

BRIEF DESCRIPTION OF THE DRAWINGS

In the drawings, in each case in a schematic diagram.

DETAILED DESCRIPTION OF EXEMPLARY EMBODIMENTS OF THE PRESENT INVENTION

Figure 1:
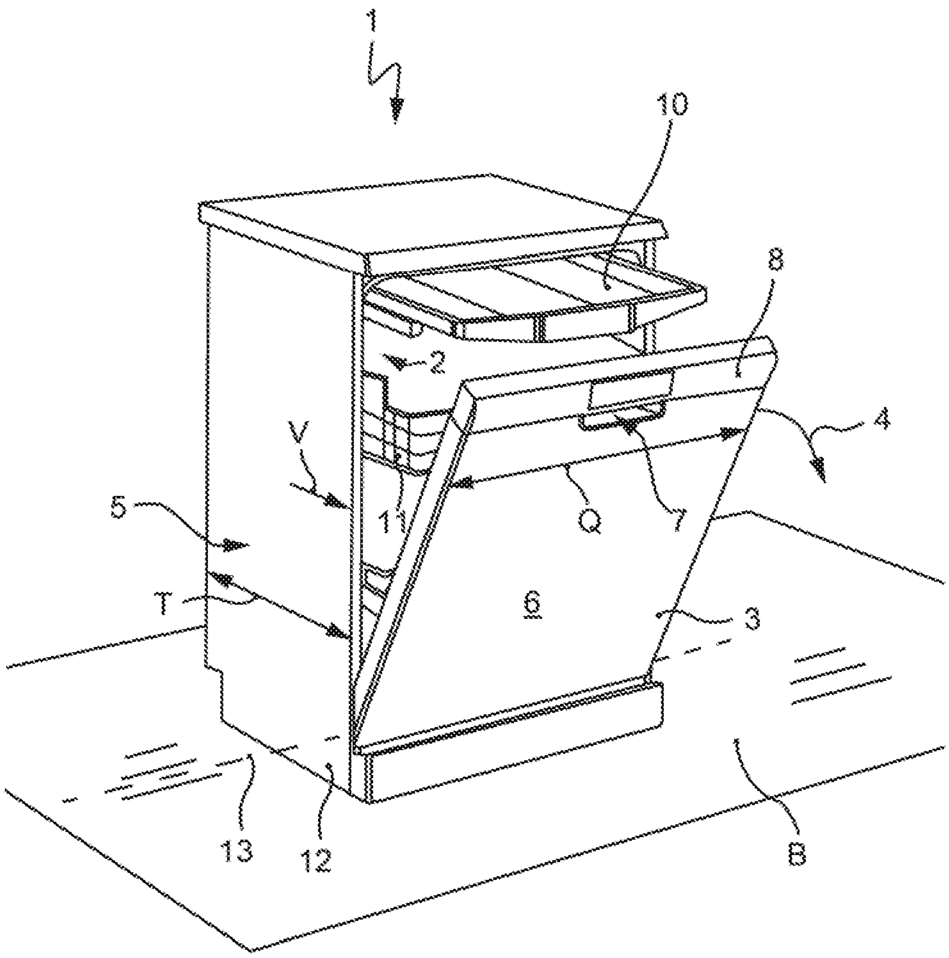
FIG. 1 shows a water-bearing household appliance, here a dishwasher with a front-side door and a dishwasher cavity in the interior, in a schematic perspective view obliquely from the front.
Figure 2:
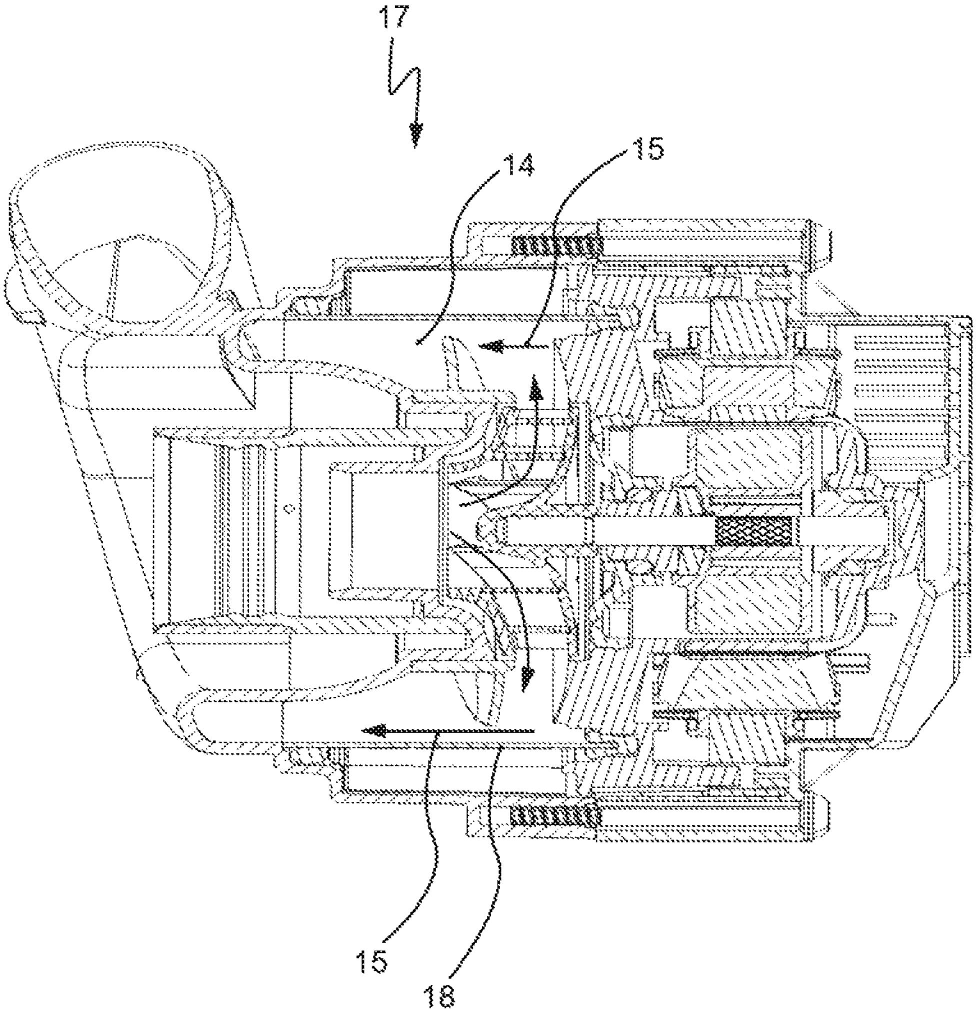
FIG. 2 shows a detailed view of a heat pump arranged in the base of the household appliance for combined fluid bearing and heating.
Figure 3:
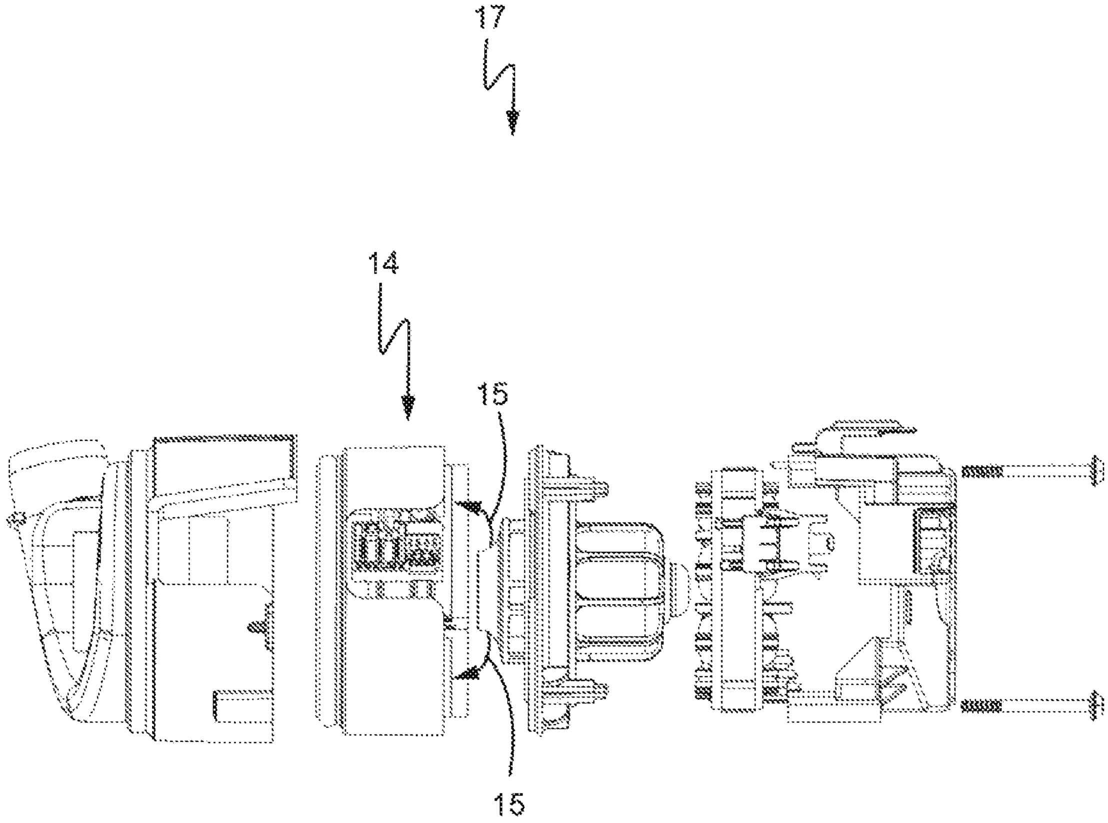
FIG. 3 shows the heat pump of FIG. 2 in an exploded view of its parts.
Figure 4:
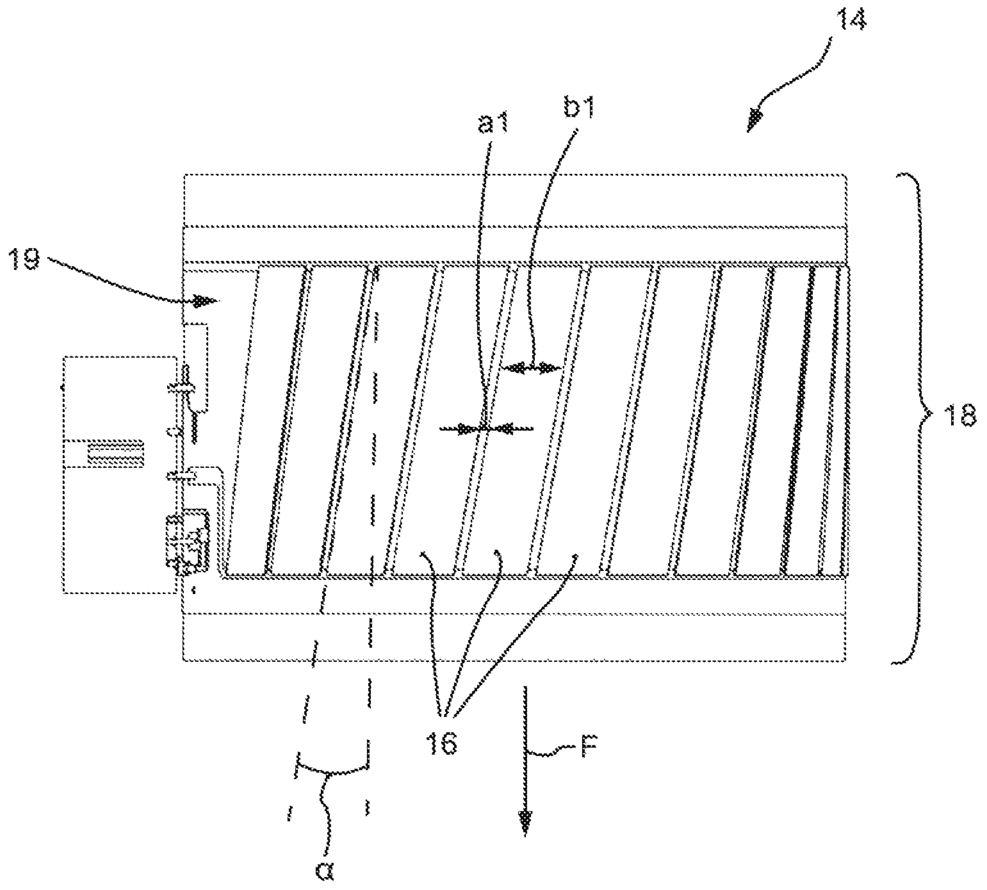
FIG. 4 shows the pipe section which can be heated in a schematic individual part view.
Figure 5:
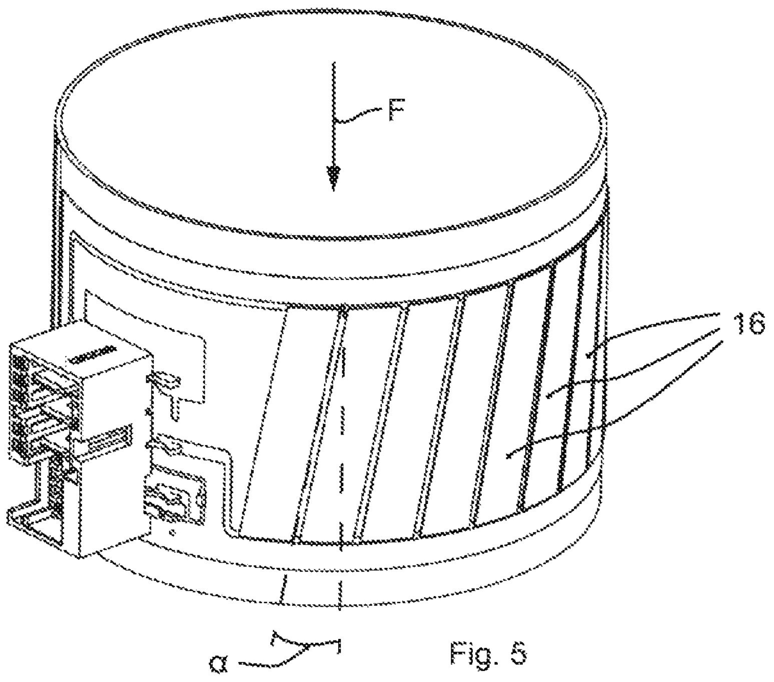
FIG. 5 shows a perspective view of the pipe section which can be heated.

The water-bearing household appliance 1 schematically illustrated in FIG. 1 is a dishwasher, namely a household dishwasher. A washing machine or other appliances in which a fluid is heated, such as a coffee machine, can also be considered.

Mutually corresponding parts are provided with the same reference characters in FIGS. 1 to 7. Only those components of a household dishwasher which are necessary for an understanding of the invention are provided with reference characters and explained. It goes without saying that the dishwasher according to the invention can comprise further parts and subassemblies.

The household dishwasher drawn here has as a component of an appliance body 5, which is outwardly partially open or closed, a dishwasher cavity 2 for receiving wash items to be dealt with, such as dishes, pans, cutlery, glasses, cooking utensils inter alia. The wash items can be held, for example, in loading units 10, 11, namely according to the drawing in racks 11 and/or a cutlery drawer 10 and what is known as washing liquor can be applied to them. Here, by way of example, two racks 11 are arranged one above the other and an additional cutlery drawer 10 is arranged in the upper region of the dishwasher cavity 2. This arrangement is not imperative. The loading units 10, 11 can be adjusted in height for example manually or with a motor and automatically or can also be designed without a height adjustment capability. In FIG. 1 the loading units 10, 11 are shown partially pulled out at the front-side V of the dishwasher, which faces the user in the installation position.

The dishwasher cavity 2 can have an at least substantially rectangular outline with a front-side V that faces the user in the operating position. This front-side V can form part of a kitchen front composed of kitchen cabinets that are side by side, or in the case of a standalone appliance can also have no contact with other cabinets.

The dishwasher cavity 2 can be closed, in particular at this front-side V, by a door or cover 3. The dishwasher cavity 2 can be opened for loading and unloading and be closed for the washing mode respectively by way of this door 3, therefore. The front door 3 can be pivoted by way of example here, in the direction 4, although this is not imperative. In FIG. 1 it is shown in the partially open and thus oblique to the vertical position. In its closed position it is perpendicular, by contrast, and, according to the drawing, can be pivoted open about a lower horizontal axis about a door hinge axis 13, forwards and downwards in the direction of the arrow 4 in order to open it, so in the fully open position it is at least almost horizontal.

On its outer side which faces the user and is vertical in the closed position, the door 3 can be provided with a decorative plate 6 in order to receive a visual and/or haptic upgrade and/or a customization to surrounding kitchen cabinets.

The dishwasher is designed here as a standalone or what is known as a partially integrated or also as a fully integrated appliance. In the latter case the appliance body 5 can also substantially end with the outer walls of the dishwasher cavity 2. A housing that surrounds this on the outside can then be partially or completely dispensed with or can be unnecessary, in particular in the region of the side walls, back wall or ceiling of the dishwasher cavity. A base 12 for receiving functional elements in particular, such as a circulating pump for washing liquor also, can be located in the lower region of the dishwasher. This circulating pump can in particular also be heated to thus bring the washing liquor to the temperature desired in the respective program step. A combined heat pump 17 is then formed.

In the exemplary embodiment according to the drawings, in its upper region the movable door 3 is assigned a control panel 8 extended in the transverse direction Q of the dishwasher, which can comprise an access opening 7 accessible from the front-side V for manual opening and/or closing of the door 3. This preferably involves what is known as a semi-integrated appliance, therefore. In the transverse direction Q the dishwasher frequently has an extension of 45, 50 or 60 centimeters. In the depth direction T from the front-side V backwards the extension is frequently similarly about 60 centimeters. The values are not imperative. The dishwasher 1 can stand on an external floor B which is ideally at least almost horizontal.

The dishwasher or the other household appliance 1 has at least one channel section 14 that can be heated from the outside and through which fluid 15 can flow. Preferably water is considered as the fluid 15, to which optionally, for example, detergent, rinse aid and/or a drying agent can be added. A fluid of this kind is frequently also called washing liquor. For heating the fluid 15, a plurality of electrically interconnected heating conductors 16 is provided, which are attached to a carrier, for example a pipe section 18. This pipe section 18 can have a round-symmetrical cross-section, for example, and form part of the heat pump 17 here, for instance a diffusor space. This is not imperative, however, but increases the integration and reduces the space requirement and the number of required components.

The attachment of the heating conductors 16 can occur, for instance, in other words, for example by way of a printing process, a plasma coating or another method for forming layers. These layers each separately form one heating conductor 16. These heating conductors are therefore present in the plural and are electrically connected together at least partially in parallel and are each arranged with one component in the flow direction F of the fluid 15. Two different electrical potentials are formed here over the circumference of the pipe section 18, between which potentials the heating conductors 16 are extended.

The heating conductors 16 are present in the plural and are electrically connected together at least partially in parallel and are each arranged with one component in the flow direction F of the fluid 15. Two different electrical potentials are formed here over the circumference of the pipe section 18, between which potentials the heating conductors 16 are extended. Running on the outside in the circumferential direction of the channel section are preferably two electrical conductor paths to provide two electrical potentials at the two ends of the respective heating conductors. Viewed in the flow direction of the fluid through the pipe section, the first electrical conductor path for the first electrical potential is provided preferably substantially at the start of the pipe section, and, in the flow direction of the fluid, the second electrical conductor path for the second electrical potential is provided preferably substantially at the end of the pipe section. The heating conductors each extend between these two conductor paths or their potentials. The heating conductors are electrically connected together in parallel, therefore. Consequently, in the event of failure of one of the heating conductors 16, operation of the remaining ones is not disrupted. With a large number of heating conductors there is always still sufficient functionality following failure of one, two or three heating conductor(s), therefore. Thermal overloading of a single heating conductor element 16 no longer results in total failure of the heater, therefore and instead this can continue to run with only low output losses; the household appliance 1 remains functional.

The heating conductor elements 16 surround the channel section 14 over a substantial part of its outer surface and in operation, during which current flows through them, introduce thermal area outputs into the channel section 14. For this, a thermal area load is applied to the pipe section 18 enveloping the channel section 14 as a function of location by the large number of heating conductors electrically connected together in parallel at their locations on the outside of the pipe section 18. This causes a heat input at the respective location of the respective heating element per given heat input area, such as per 1 $cm^2$, into the jacket of the pipe section 18 and, corresponding herewith, into the channel section 14.

Attached to the outside of the pipe section 18, here with the heating conductors 16, is, in particular, a thick film heater 19, which is formed with an optimally large number of heating conductors electrically connected together in parallel, which form individual heating resistors. Compared to their width extension b1, these each have a significant longitudinal extension.

Preferably, the pipe section 18 extends substantially longitudinally, in particular largely in a straight line. The fluid flows through this pipe section with a directional component substantially along the longitudinal extension of this pipe section. In particular, the respective heating conductor extends on the outside of the pipe section from the input region up to the output region of the pipe section. As already described in the details of the advantages, the heating conductors 18 are arranged substantially in the fluid direction F of the fluid 15 but, advantageously, are not exactly parallel to the flow direction F but are at an angle $\alpha$ between 0.1° and 30° with respect to the flow direction F, in particular at an angle $\alpha$ between 5° and 20°, as can be seen, for instance, in FIGS. 4 to 7.

The spacing a1 shown in the drawings perpendicular to the flow direction F is between 0.4 and 5 millimeters between the heating conductors 16.

The spacing a1 is smaller than the transverse extension b1 of a respective heating conductor 16 whose transverse extension b1 is between 1 millimeter and 30 millimeters. This transverse extension b1 is also marked perpendicular to the flow direction F. It is between two millimeters and 15 millimeters.

Figure 6:
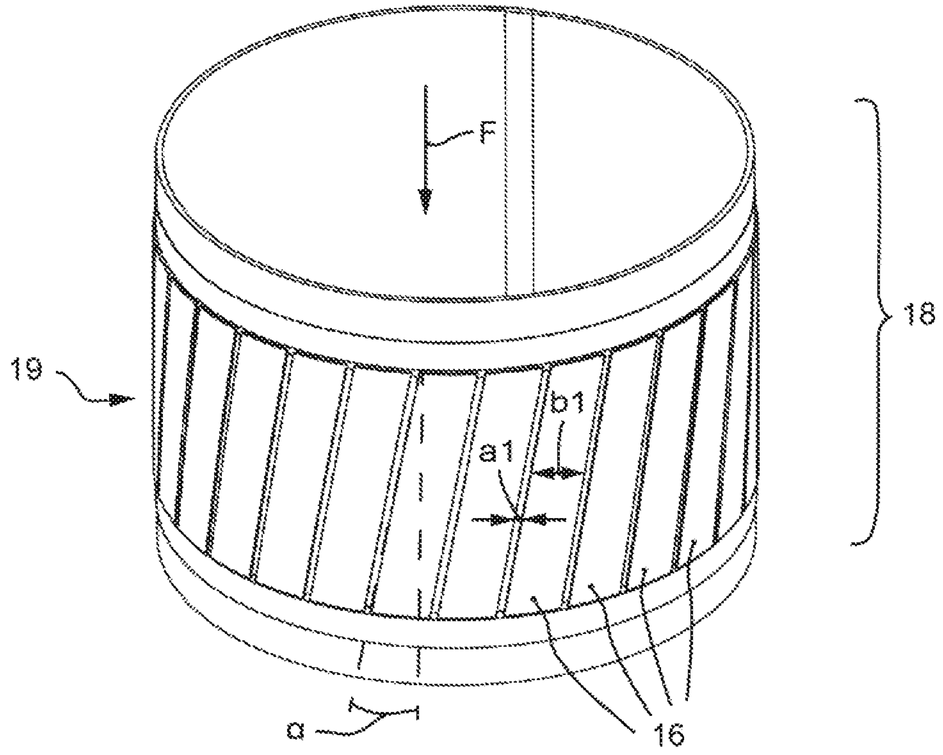
FIG. 6 shows a similar view to FIG. 5, with the view being turned in the circumferential direction of the pipe section compared to FIG. 5.
Figure 7:
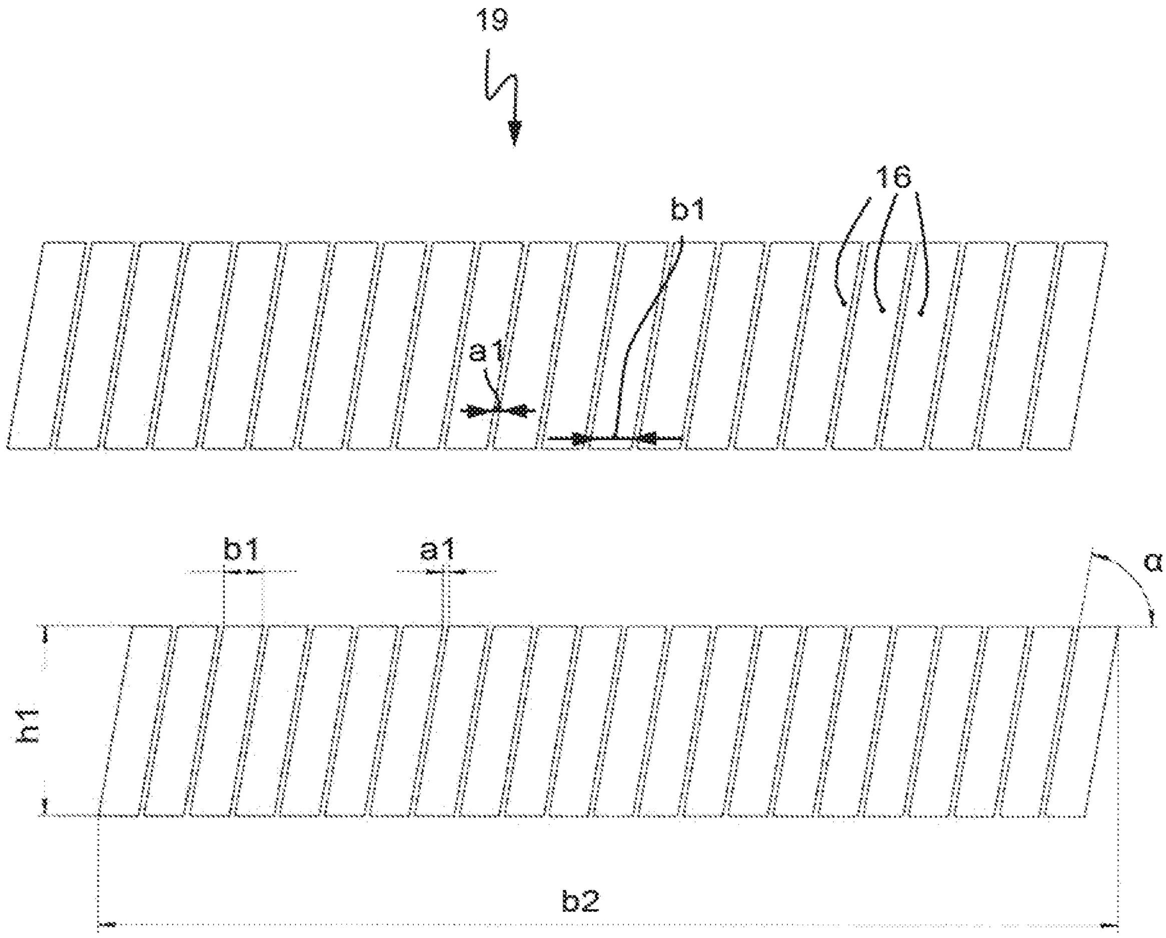
FIG. 7 shows two merely schematic views of the heating conductors "uncoiled" from the circumference of the pipe section as a conceptual model.

Five to 100 heating conductors, in particular 10 to 60 heating conductors 16, are arranged preferably distributed over the circumference of the channel section 14 in a typical heat pump 17 with a pipe section 18 of less than ten centimeters' diameter, in particular 20 to 40 heating conductors 16. These can be attached, but do not have to be, so as to be equally distributed, as is shown in FIG. 6. This results in particularly uniform fluid heating over the circumference.

As it is possible to continue to operate the heater 19 as a whole even when individual heating elements 16 blow, this optimizes the quality in respect of the working life. In addition, the robustness of the household appliance 1 is increased even against said faulty operations.

The heating conductor elements 16 can be attached, in particular, by way of a high-resistance paste system. This results in a reduction in costs. A reduction in the weight of materials used for the heating conductor paste is also produced.

The invention claimed is:

1. A household appliance, comprising:

a channel section heatable from outside, the channel section extending substantially in a longitudinal direction and being configured for passage of a fluid, the passage of fluid being in a flow direction that is substantially parallel to the longitudinal direction of the channel section; and a plurality of electrically interconnected heating conductor elements for executing a heating action, with at least some of the heating conductor elements being electrically connected together in parallel, and with each of the heating conductor elements having a longitudinal extension and a transverse extension, wherein the longitudinal extension is greater in length than the transverse extension, wherein each of the heating conductor elements are positioned with the longitudinal extension substantially in the longitudinal direction of the channel section, and wherein the longitudinal extension of each of the heating conductor elements is positioned at an angle that is in a range of 0.1° and 30° with respect to the flow direction of the fluid.

2. The household appliance of claim 1, further comprising a dishwasher having a dishwasher cavity for receiving wash items, wherein the fluid is washing liquor, which is heatable and mixed with detergent, a rinse aid, or a drying agent and applied to the wash items.

3. The household appliance of claim 2, wherein the dishwasher is a household dishwasher.

4. The household appliance of claim 1, further comprising a heat pump configured to heat the fluid.

5. The household appliance of claim 1, further comprising a circumferentially closed pipe section configured to encompass the channel section.

6. The household appliance of claim 5, further comprising a heater attached to an outside of the pipe section.

7. The household appliance of claim 6, wherein the heater is a thick film heater.

8. The household appliance of claim 6, wherein the heater includes a number of the plurality of heating conductor elements connected together in parallel and forming individual heating resistors.

9. The household appliance of claim 8, wherein the number of the plurality of heating conductor elements is five to 100, and wherein the plurality of heating conductor elements are arranged and distributed over a circumference of the channel section.

10. The household appliance of claim 8, wherein the number of the plurality of heating conductor elements is 10 to 60, and wherein the plurality of heating conductor elements are arranged and distributed over a circumference of the channel section.

11. The household appliance of claim 8, wherein the number of the plurality of heating conductor elements is 20 to 40, and wherein the plurality of heating conductor elements are arranged and distributed over a circumference of the channel.

12. The household appliance of claim 1, wherein the longitudinal extension of each of the heating conductor elements is positioned at an angle that is in a range of 5° and 20° with respect to the flow direction of the fluid.

13. The household appliance of claim 1, wherein the spacing between each of the heating conductor elements is smaller than the transverse extension of each of the heating conductor elements.

14. The household appliance of claim 1, wherein the transverse extension is between one millimeter and 30 millimeters.

15. The household appliance of claim 1, wherein the transverse extension is between two millimeters and 15 millimeters.

* * * * *